United States Patent [19]

Harrison

[11] Patent Number: 6,075,223
[45] Date of Patent: Jun. 13, 2000

[54] HIGH CONTRAST SURFACE MARKING

[75] Inventor: Paul Wollcott Harrison, Los Angeles, Calif.

[73] Assignee: Thermark, LLC, Pittsburgh, Pa.

[21] Appl. No.: 08/925,031

[22] Filed: Sep. 8, 1997

[51] Int. Cl.[7] .................................................. B23K 26/00
[52] U.S. Cl. ...................... 219/121.85; 347/224; 427/555
[58] Field of Search ........................... 427/554, 555, 427/556; 219/121.69, 121.61, 121.85, 121.67; 430/346, 200, 945; 65/30.11; 347/224, 247; 346/135.1

[56] References Cited

U.S. PATENT DOCUMENTS

| | | | |
|---|---|---|---|
| 3,945,318 | 3/1976 | Landsman | 430/200 |
| 3,962,513 | 6/1976 | Eames | 430/200 |
| 4,306,012 | 12/1981 | Scheve . | |
| 4,327,283 | 4/1982 | Heyman et al. | 235/487 |
| 4,515,867 | 5/1985 | Bleacher et al. | 428/204 |
| 4,541,340 | 9/1985 | Peart et al. | 101/470 |
| 4,651,313 | 3/1987 | Guez | 369/14 |
| 4,769,310 | 9/1988 | Gugger et al. | 430/346 |
| 4,847,181 | 7/1989 | Shimokawa | 430/297 |
| 4,854,957 | 8/1989 | Borrelli et al. | 65/30.11 |
| 4,856,670 | 8/1989 | Hang . | |
| 4,861,620 | 8/1989 | Azuma et al. | 427/53.1 |
| 4,912,298 | 3/1990 | Daniels et al. | 219/121.69 |
| 5,030,551 | 7/1991 | Herren et al. | 430/495 |
| 5,035,983 | 7/1991 | Kiyonari et al. | 346/135.1 |
| 5,061,341 | 10/1991 | Kildal et al. | 156/632 |
| 5,075,195 | 12/1991 | Babler et al. | 430/200 |
| 5,175,425 | 12/1992 | Spratte et al. | 347/224 |
| 5,359,176 | 10/1994 | Balliet, Jr. et al. | 219/121.67 |
| 5,397,686 | 3/1995 | Dominick et al. | 430/346 |
| 5,409,742 | 4/1995 | Arfsten et al. | 427/555 |
| 5,427,825 | 6/1995 | Murnick | 427/555 |
| 5,523,125 | 6/1996 | Kennedy et al. | 427/555 |
| 5,543,269 | 8/1996 | Chatterjee et al. | 430/346 |
| 5,554,335 | 9/1996 | Fields et al. | 264/400 |
| 5,609,778 | 3/1997 | Pulaski et al. | 219/121.69 |
| 5,637,244 | 6/1997 | Erokhin | 219/121.69 |
| 5,719,372 | 2/1998 | Togari et al. | 219/121.61 |
| 5,734,412 | 3/1998 | Hasebe et al. | 347/247 |
| 5,740,941 | 4/1998 | Lemelson | 220/454 |
| 5,760,367 | 6/1998 | Rosenwasser et al. | 219/121.69 |
| 5,761,111 | 6/1998 | Glezer | 365/106 |
| 5,767,483 | 6/1998 | Cameron et al. | 219/121.85 |
| 5,783,507 | 7/1998 | Sakoske | 501/17 |
| 5,801,356 | 9/1998 | Richman | 219/121.69 |
| 5,804,342 | 9/1998 | Paz-Pujalt et al. | 430/19 |

FOREIGN PATENT DOCUMENTS

| | | |
|---|---|---|
| 0 419 377 A1 | 9/1990 | European Pat. Off. . |
| 0 531 584 A1 | 3/1991 | European Pat. Off. . |
| 0761377A1 | 8/1996 | European Pat. Off. . |
| 0 782 933 A1 | 12/1996 | European Pat. Off. . |
| 0716 135 A1 | 12/1996 | European Pat. Off. . |
| 201136 | 9/1981 | German Dem. Rep. . |
| 215 776 A1 | 11/1984 | Germany . |
| 35 39 047 A1 | 10/1986 | Germany . |
| 62-223940 | 10/1987 | Japan . |
| 63-216790 | 9/1988 | Japan . |
| 1-194235 | 8/1989 | Japan ................................. 427/554 |
| 5-138114 | 6/1993 | Japan ................................. 427/554 |
| 6-106378 | 4/1994 | Japan . |
| 2 227 570 | 1/1990 | United Kingdom . |
| WO 95/13195 | 5/1995 | WIPO . |
| WO/963221 | 10/1996 | WIPO . |

OTHER PUBLICATIONS

Authors: Karheinz Hahn, Claudia Buerhop, and Rudolf Weißmann Title: "Finring PbO–free glass enamels using the cw–CO2 laser".

International Searching Authority, International Search Report, Aug. 9, 1989, 9 pages total.

*Primary Examiner*—Geoffrey S. Evans

[57] ABSTRACT

A method of laser marking metals, plastics, ceramic materials, glazes, glass ceramics, and glasses of any desired form, which comprises applying to the material to be marked a variable thickness layer of marking material containing energy absorbing enhancers then irradiating said layer with a laser or diode based energy source such that the radiation is directed onto said layer in accordance with the form of the marking to be applied, and using a laser or diode based energy source of a wavelength which is sufficiently absorbed by the marking material so as to create a bonding of the marking material to the surface of the workpiece at the irradiated areas.

34 Claims, 13 Drawing Sheets

P TYPE

Fig. 9

| Substrate Material | Marking Material | Beam Speed | Power (watts) | Freq (Khz/CW) |
|---|---|---|---|---|
| Aluminum | Mixed Metal Oxide | 200mm/sec | 5 watts | CW |
| Aluminum | Glass Frit | 250mm/sec | 5 watts | CW |
| Brass | Mixed Metal Oxide | 200mm/sec | 5 watts | CW |
| Ceramic | Glass Frit | 200mm/sec | 5 watts | CW |
| China | Glass Frit | 200mm/sec | 5 watts | CW |
| Copper | Mixed Metal Oxide | 100mm/sec | 5 watts | 20 KHz |
| Auto Safety Glass | Glass Frit | 200mm/sec | 5 watts | CW |
| CRT Display Glass | Glass Frit | 200mm/sec | 5 watts | CW |
| Flat Panel Display Glass | Glass Frit | 200mm/sec | 5 watts | CW |
| Microscope Slide Glass | Glass Frit | 200mm/sec | 5 watts | CW |
| Nickel | Mixed Metal Oxide | 200mm/sec | 5 watts | CW |
| Nylon™ | Mixd Metal Oxides | 250mm/sec | 5 watts | CW |
| Porcelain | Glass Frit | 200mm/sec | 5 watts | CW |
| PVC | Mixed Organic Pigments | 200mm/sec | 5 watts | CW |
| Stainless Steel | Mixed Metal Oxide | 200mm/sec | 5 watts | CW |
| Stainless Steel | Glass Frit | 300mm/sec | 5 watts | CW |
| Teflon™ | Mixed Metal Oxides | 200mm/sec | 5 watts | CW |
| Tin | Mixed Metal Oxide | 200mm/sec | 5 watts | CW |
| Titanium | Mixed Metal Oxide | 200mm/sec | 5 watts | CW |

HIGH CONTRAST SURFACE MARKING

FIELD OF INVENTION

The present invention relates to a method of producing permanent, enhanced contrast and/or color markings formed as a new marking layer on top of substrates including glass, ceramic, porcelain, metal, and plastic. A laser beam irradiates a marking medium having a glass frit containing an energy absorbing enhancer, or alternatively the marking medium can be a mixed metal oxide or a mixed organic pigment.

BACKGROUND OF THE INVENTION

The marking of ceramic materials, glazes and glasses can be effected by conventional marking and decoration methods such as etching, cutting, engraving, grinding or by applying a glass or glaze colorant. In these methods, the surface of the marked material is altered with the consequence that the material may suffer damage, especially if marking is effected by etching, engraving, or cutting. The application of a glass or glaze colorant necessitates, in addition, a second firing step. The markings so produced are not always satisfactory in all respects.

It is also known to mark glass by means of a laser beam, whereas the known methods are based on melting or removing substrate material such that the surface of the marked material is also altered.

German Offenlegungsschrift 3 539 047 postulates a method of decorating, marking, and engraving enameled objects using laser beams by incorporating into the enamel coating opacifying agents which the laser beam causes to decompose optically and locally; for example, oxides of titanium, tin, cerium, and antimony. A drawback of this method is that, for example, transparent enameled objects cannot be marked because the opacifying agent incorporated in the enamel coating does not change optically at the non-irradiated areas and, therefore, strongly influences the overall appearance of the object. Furthermore, the opacifying agent employed may adversely affect the mechanical properties of the enamel.

Industry has sought to surface mark glass, ceramic, porcelain, metal, plastics, and the like with four physical attributes. These four attributes are high-resolution, high-contrast, permanence, and speed.

Well known efforts to date have only produced two or three of these attributes. For example, kiln marking ceramics using glass frit material at kiln temperatures ranging from 100° to 1000° C. results in high-resolution, high-contrast, permanent indicia on ceramics, glass, and metals. These known processes require heating the entire substrate along with the glass frit or metal oxide marking material in a kiln. The problem with these processes is the time factor and energy consumption are not commercially efficient to create the indicia. Time factors ranging from minutes to hours are common. Energy consumption of a kiln is generally measured in kilowatts per ton and/or BTUs per pound. Furthermore, these processes do not lend themselves to portability.

Another known marking method is peening on metal. This method cannot be used on glass, ceramic, or other brittle materials because of surface damage and/or breakage. Where used, this method produces a high-resolution, permanent, fast surface indicia. However, high contrast marks are not produced.

Other known marking methods are ink printing methods. One state of the art transfer printing method is taught by WO 95/13195 (May 1995) to Meneghine et al. assigned to Markem Corporation. These methods use a laser-transferable ink on a plastic carrier. The ink is mixed in a transfer medium solution in order to enhance the conversion of laser (IR) energy to heat. These methods produce a high-resolution, high-contrast, and relatively fast method. There is a UV cure step which is time consuming. The problem with this and all ink methods is a lack of permanence. Acids and other solvents remove ink from a hard surface. This method teaches curing the ink onto the substrate surface. The present invention teaches bonding a marking medium to form a new marking layer atop the substrate surface rather than transferring an ink to the substrate and then curing the ink.

Another well known marking method teaches the use of ink jet printers. In order to improve application performance, appearance and permanence, environmentally hazardous solvents are mixed with the ink. Even with these hazardous solvents however, significant improvement has not been achieved.

U.S. Pat. No. 4,541,340 (1985) to Peart et al. discloses a printing process for marking fabrics or plastics in a permanent image. Sublimable dyes are used such as nitroso dyes. A diffusion of the dyestuff into the substrate is caused by a pressurized air step on a transfer label. Only application to fabrics and plastics is taught. The chemistry is different from the present invention. However, the result of a permanent high contrast mark is claimed.

Another related group of marking methods is laser combined with glass frit or metal oxide marking mediums. U.S. Pat. No. 4,769,310 (1988) to Gugger et al. teaches first creating a glaze in a kiln process. The glaze has a radiation sensitive additive in amounts ranging from 0.01 to 30% by weight. This glaze is then irradiated by a beam of Nd:YAG pulsed laser having light pulses of six to eight nanoseconds at a wavelength of 0.532 μm and a pulse content of 250 milli-joules. The problem with this method is the burden of creating a time consuming glaze surface before applying the high-speed laser beam.

U.S. Pat. No. 5,030,551 (1991) to Herren et al. teaches a laser-based method to mark ceramic materials, glazes, glass ceramics, and glasses by first applying to a workpiece a 100 to 10,000 Angstrom thick transparent layer of titanium dioxide. Second, the workpiece is fired in an oven at 620° C. for one minute and then slowly cooled in the closed oven. Third, the layer is irradiated with a pulsed laser in accordance with the form of the marking to be applied. The laser light must have a wavelength which is sufficiently absorbed by the oxide layer so that a discoloration of the oxide layer is produced at the irradiated areas. The problem with this method is the time and energy-consuming step of firing and cooling the workpiece.

The method of the present invention makes it possible to produce a direct and rapid marking that is indelible and which is, therefore, abrasion and scratch-proof. The markings obtained are also corrosion-proof, solvent-resistant, dimensionally stable, free from deformation, fast to light, heat, and weathering, easily legible, and have good contrast and very good edge definition. In addition, there is virtually no impairment of the mechanical, physical, and chemical properties of the marked material, e.g. mechanical strength and chemical resistance.

There has now been found a flexible method which makes it possible to mark metals, plastics, ceramic materials, glazes, glass ceramics and glasses without damaging the surface thereof and without specific requirements being made of the substrate, which method comprises the use of a glass frit based or mixed organic materials or mixed metal oxide layer for the laser marking.

Accordingly, the present invention relates to a method of laser marking metals, plastics, ceramic materials, glazes, glass ceramics and glasses of any desired form which comprises applying to the substrate material a marking material which, depending upon its principal components, may or may not contain at least one energy absorbing enhancer then irradiating said marking material layer with a laser or diode based energy such that the radiation is directed onto said layer in accordance with the form of the marking to be applied, and using laser or diode based energy of a wavelength which is sufficiently absorbed by the marking material so that a bonding occurs on the substrate, thereby forming a marking layer atop the substrate.

SUMMARY OF THE INVENTION

The main aspect of the present invention is to provide a method to quickly, with high-resolution, high-contrast, and permanence, mark the surface of a workpiece.

Another aspect of the present invention is to provide a method to irradiate a marking material which may or may not contain at least one energy absorbing enhancer, wherein the marking material is selected from the group consisting of glass frits, glass frits with ceramic colorants, and glass frits with porcelain enamels where the workpiece is glass, ceramic, porcelain, certain metals, and certain plastics (Clear glass and glass frits do not absorb energy in the 1 micron range of te Nd:YAG or diode lasers, but do absorb energy in the 10 micron range, so these materials may not require additional energy absorbing enhancers.).

Another aspect of the present invention is to provide a method to irradiate a marking material containing mixed metal oxides where the workpiece is metal, glass, ceramic, porcelain and certain plastics.

Another aspect of the present invention is to provide a method to irradiate a marking material containing mixed organic pigments where the workpiece is plastic, glass, ceramic, porcelain and certain metals.

Other aspects of this invention will appear from the following description and appended claims, reference being made to the accompanying drawing forming a part of this specification wherein like referenced characters designate corresponding parts in the drawing.

Prior to the present invention, no quick and permanent method existed for marking certain substrate materials with enhanced contrast and/or color which would also permit the rapid change of content and/or information in the mark without structural damage to the substrate material. In theory, an optical power source, properly focused, could create the same temperatures obtained by ovens and/or kilns used in conventional "firing" processes involving marking materials. The speed of computer controls for the optical power source, the beam steering mechanism and the mark content make it possible for individual enhanced contrast and/or color marks to be bonded to the various substrate materials in extremely short time periods without structural damage in a way not attainable by any other marking or decorating process. The wide variety of marking materials make it possible to produce images with varying optical properties including, but not limited to, contrast, color, reflectance, diffraction; and varying physical properties including, but not limited to, thickness, durability, stability, structural shape and electrical conductivity.

The present inventive process of permanently marking materials will be especially useful in marking glass, ceramic, porcelain, and other brittle materials whose surface structure cannot withstand the thermal shock of other commonly used high-power pulsed laser marking methods. In the present invention, the resulting image on all substrate materials has enhanced contrast and/or color which makes the mark more easily viewed and imaged by the human eye and/or machine vision equipment and is highly resistant to chemical and mechanical wear. This feature is a great advance in barcode and 2D symbology marking, whereas the prior art high-power pulsed laser-only marking systems cannot always create sufficient contrast and/or color markings.

This invention relates to the permanent bonding of enhanced contrast and/or colored materials to the surfaces of various glass, ceramic, porcelain, metal, and plastic substrates using radiant energy produced by, but not limited to, optical power sources such as lasers, laser diodes, and direct diodes. The sun's radiant energy, properly filtered and focused, could make an acceptable radiant energy source. The wavelength ($\lambda$) and output power (watts) of the optical power source are determined by the combination of the composition of the substrate material and the natural or enhanced energy absorbing characteristics of specific marking material to be applied. The marking materials are formulated to react with various substrate materials at certain temperatures. The radiant energy source can produce the required temperatures in small localized areas within microseconds and create an environment where the desired chemical and mechanical reactions will occur. Virtually any computer-generated mark can be produced on a substrate by moving the beam emanating from the radiant energy source on the marking material on the surface of the workpiece using conventional beam steering mechanisms and/or X-Y plotter mechanisms and/or by moving the workpiece relative to a stationary beam.

The marking material is brought into contact with or physically applied to the surface of the workpiece. The beam emanating from the radiant energy source impinges upon the marking material, which absorbs the radiant energy and elevates it to the required temperature. In absorbing the radiant energy, at least a portion of the marking material is excited, i.e. has its atoms or molecules raised to an excited state. [See *Webster's Encyclopedic Unabridged Dictionary of the English Language* (Portland House, New York, 1989), page 497.] Typically, a temperature of 200° to 1500° F. is reached in approximately one to two microseconds. Precise temperatures are controlled by the output power of the radiant energy source and the physical position of the marking material relative to the focal plane of the radiant energy beam and the speed with which the beam is moving. Once the required temperature is achieved, the marking material and substrate will permanently bond together to form a new marking layer atop the substrate. The interaction of the radiant energy and the marking material is believed to result in an inert coating mechanically and chemically bonded to the substrate material. The marking layer is believed to form covalent bonds with the substrate material, and it is believed this chemical bond exceeds the strength of the mechanical bond. Marking materials can be formulated to absorb specific amounts of a specified wavelength of the radiant energy.

$CO_2$ lasers are capable of permanently marking glass materials by thermally shocking the surface and causing fractured facets. These fractures are detrimental to the structural integrity of the glass and will continue to propagate, causing chips to fall out of the mark. Furthermore, the imaged mark has no enhanced contrast and is difficult to view or image. Certain organic materials (wood, plastic, etc.) are easily marked using $CO_2$ lasers, but the resulting imaged mark can only have limited color and/or contrast based on the material composition and the effect of the laser energy (it will cause burning of the surface). There are a number of specially formulated plastic materials that will change color when exposed to specific laser energy and produce an enhanced contrast mark.

Nd:YAG lasers are generally capable of permanently marking a variety of metals and some organic materials. However, the same limited variation of color and contrast applies. Some steels and other hard metals can be burned with sufficient laser power to produce a dark mark against the natural surface color. However, the heat created by this method causes the area surrounding the mark to darken resulting in significantly decreased contrast. Additionally, very few color variations are possible. Most direct diodes cannot produce sufficient beam quality or power to achieve the same effects as the Nd:YAG lasers.

The principal advantages of the inventive process are:

no structural damage to the substrate material surface;

no post processing required to stabilize the finished mark;

wide variety of colors, contrasts and physical properties;

high resolution for the imaged mark;

resistant to chemical and mechanical wear;

marking speeds in seconds not minutes or hours;

image content can be changed at computer speeds; and individual marks can be fully automated.

Features of the inventive process believed to be new are:

1) The use of laser or diode based radiation to rapidly elevate the temperature of the marking material atop the substrate to form a new marking layer atop the substrate.

2) a single laser beam pass is all that is required.

3) Selecting marking materials specially formulated to react with specific substrate materials using laser or diode based radiation as the catalyst.

4) Speed with which the mark can be produced.

5) Speed with which the content of the mark can be changed.

6) Method of delivery of marking material to the substrate surface.

7) Marks can be applied to glass and other brittle surfaces without fracturing.

8) Enhanced contrast and/or color of mark.

9) Two-, three-, or four-color images can be marked with near photo quality.

10) Elimination of any firing step of entire workpiece.

11) Ability to first ablate (if desired) and then mark selected substrates to create 3D high-contrast markings with a simple two-step process.

12) Using relatively low-cost, low-contaminating marking materials (glass frits, mixed metal oxides, or mixed organic pigments) instead of silver oxides or other high-cost highly-toxic materials.

13) Higher resolution of imaged mark (>1000 dpi).

EXAMPLES AND FIGURES

In all the below listed figures, the resulting marks were produced on commercially available Nd:YAG laser markers as manufactured, for example, by Lumonics Corporation, A B Lasers, Inc., Controlaser, Inc., and/or Rofin Sinar, Inc. with power capability and optical configurations capable of providing the referenced marker parameters. In all examples the laser marker utilized produced a spot size of 100 to 125 microns, and the surface of the workpiece was placed 2 mm to 3 mm below the focal plane of the laser beam. In FIG. 2 through FIG. 8 the marking material was manually applied using a soft brush with resulting thicknesses varying between 75 and 125 microns on the workpiece surface.

FIG. 1 is a photograph of a transfer label using Cerdec 24-2702 glass frit containing energy absorbing enhancers as the marking material having a thickness of approximately 250 microns and a soda-lime glass microscope slide workpiece after the inventive process. The left mark was produced using 5 watts of CW energy at a beam speed of 200 mm/second exhibiting high contrast from all viewing angles with no detectable damage to the workpiece surface. The right mark was produced using the same laser settings except that the beam speed was 300 mm/second resulting in diminished contrast.

FIG. 2 is a photograph of a stainless steel workpiece having the uppermost mark produced using Cerdec 29-1777 Amber Stain mixed metal oxide mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second. The lower mark was produced using the same laser settings without the inventive process resulting in only an ablative laser process and a mark of varying contrast that is totally dependent upon the viewing angle.

FIG. 3 is a photograph of a polished stainless steel workpiece having the mark produced using Cerdec 29-1777 mixed metal oxide mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 4 is a photograph of an aluminum workpiece having the mark produced using 10 parts Cerdec 29-1060 mixed metal oxide combined with 1 part Cerdec 29-1777 mixed metal oxide and then mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 5 is a photograph of an alumina ceramic workpiece having the mark produced using Cerdec 24-2702 glass frit containing energy absorbing enhancers mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 6 is a photograph of a quartz-glass light bulb having the mark produced using Cerdec 24-2702 glass frit containing energy absorbing enhancers mixed at a 1/1 ratio by weight with mineral oil as the marking material with the inventive process and exhibiting high contrast from all viewing angles with no detectable damage to the workpiece surface. The mark was produced using 5 watts of CW energy at a beam speed of 200 mm/second.

FIG. 7 is a photograph of a soda-lime glass microscope slide having the mark produced using Cerdec 24-2702 glass frit containing energy absorbing enhancers mixed at a 1/1 ratio by weight with mineral oil as the marking material with the inventive process to form a 2D symbology mark with alpha-numeric characters and exhibiting high contrast from all viewing angles with no detectable damage to the workpiece surface. The mark was produced using 5 watts of CW energy at a beam speed of 200 mm/second.

FIG. 8 is a photograph of a piece of borosilicate flat panel display glass having the mark produced using Cerdec 24-2702 glass frit containing energy absorbing enhancers mixed at a 1/1 ratio by weight with mineral oil as the marking material with the inventive process to form a 2D symbology mark with alpha-numeric characters and exhibiting high contrast from all viewing angles with no detectable damage to the workpiece surface. The mark was produced using 5 watts of CW energy at a beam speed of 200 mm/second.

FIG. 9 is a chart showing the laser marker parameters used to produce marks on a variety of substrate materials.

Figure 1:
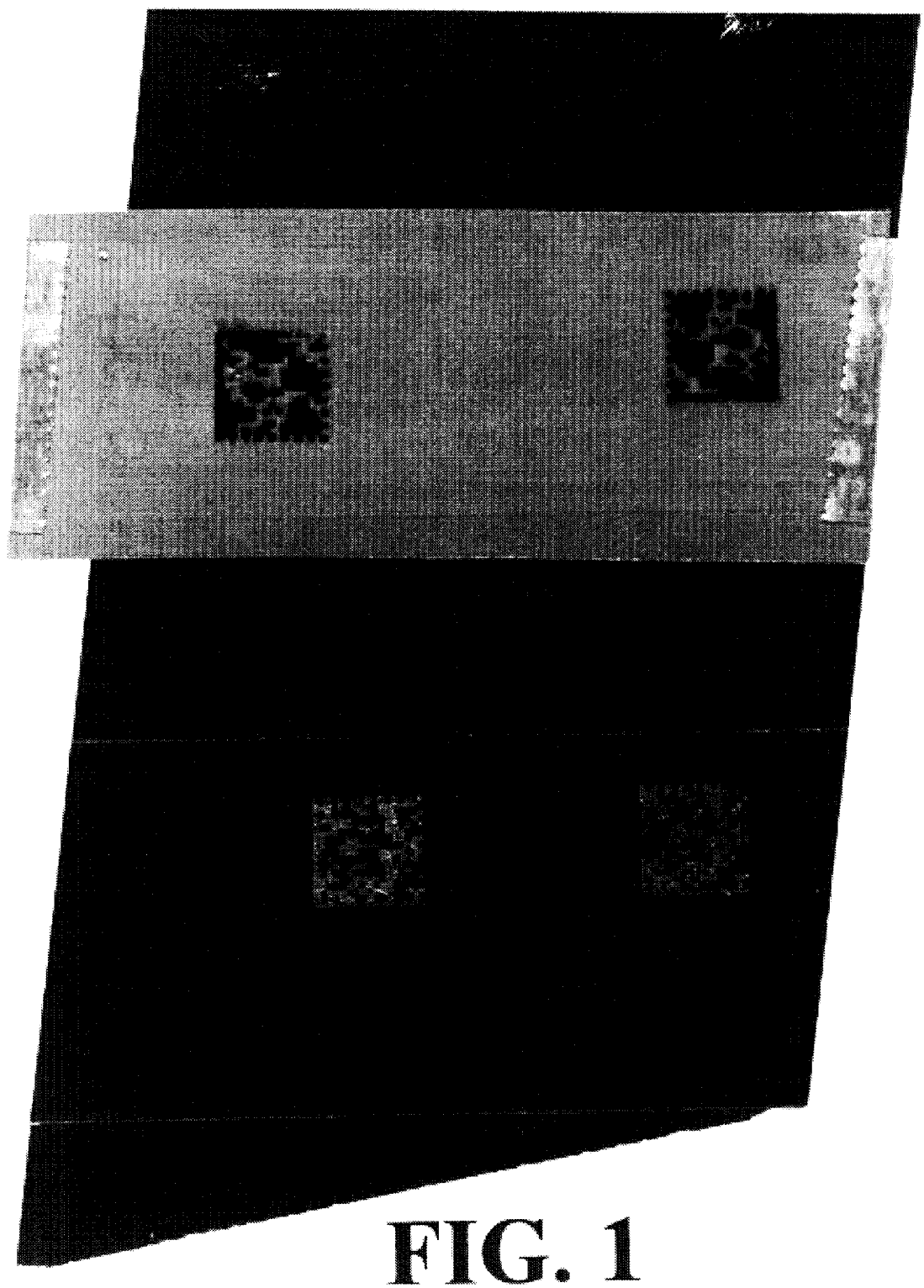
Figure 2:
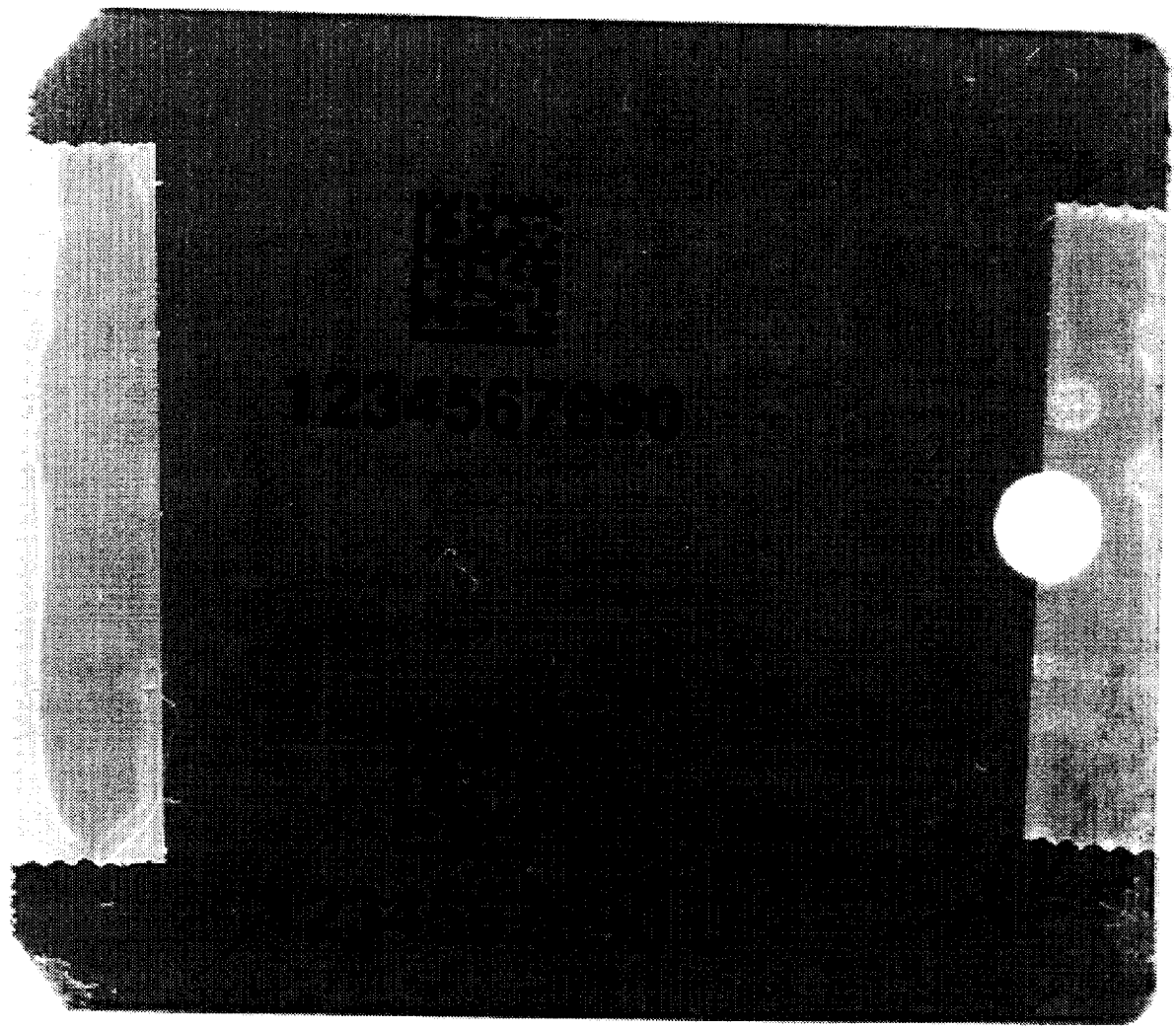
Figure 3:
Figure 4:
Figure 5:
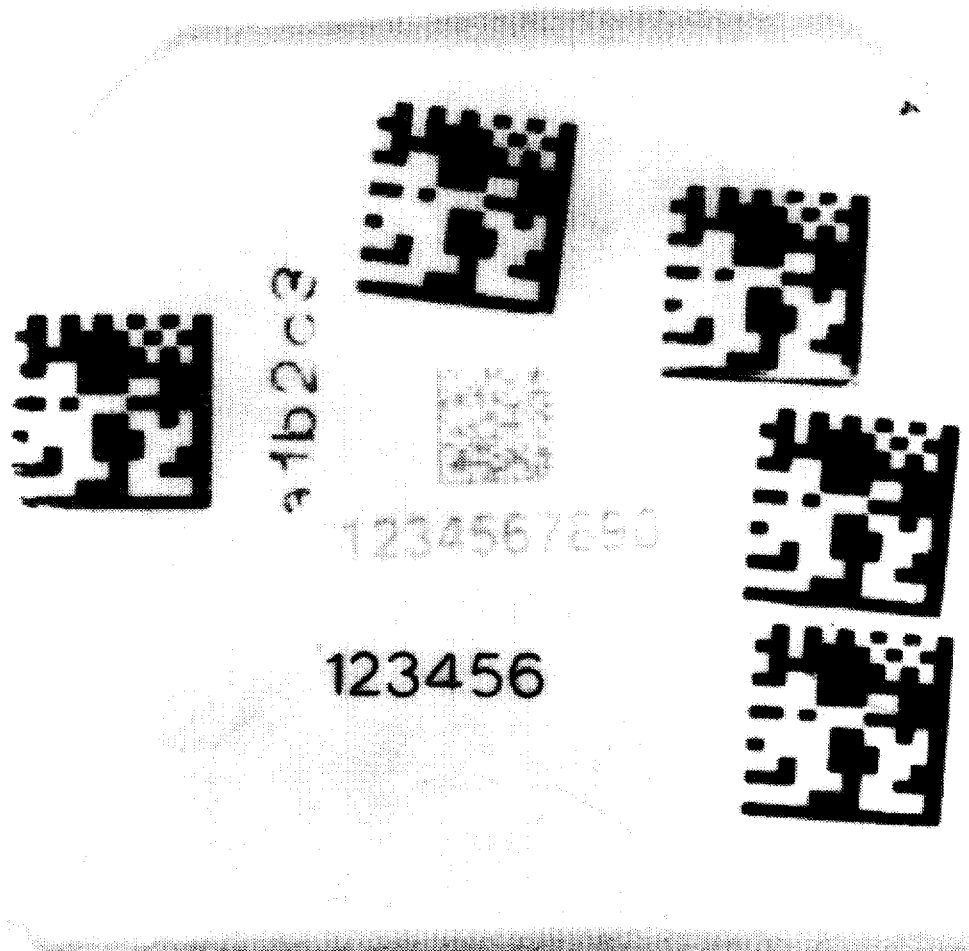
Figure 6:
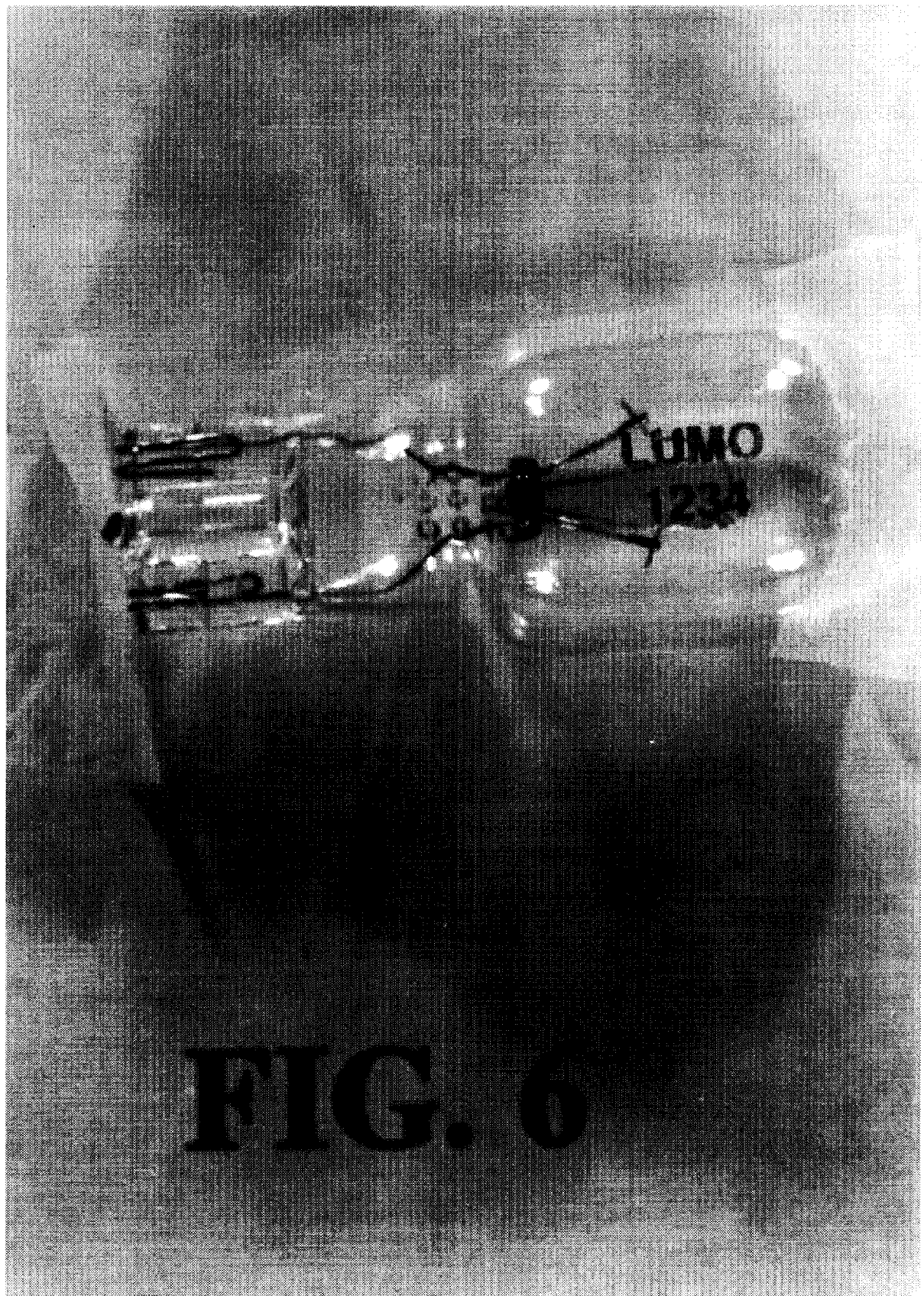

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE PREFERRED EMBODIMENTS

Below follow some basic definitions as used herein:

Ceramic and porcelain enamel: A soft melting glass similar in all cases and like other ceramic glazes, composed of fluxes and alumino-silicates. Porcelain enamels are typically used on metallic surfaces.

Glass frits: Pre-fused glass material which is produced by fritting (the rapid chilling of the molten glassy material), then ground to a powder. Frits are typically employed as a constituent in a glaze.

Mixed metal oxides: An oxide compound consisting of more than one metal oxide.

Glass frits generally are composed of alkali metal oxides, alkaline earth metal oxides, silica, boric oxide and transition metal oxides. In specific, additional information is known about the marking materials Cerdec 29-1060 Amber stain, which contains silver sulfide, copper, copper oxide, barium sulfate, iron sulfide, calcium hydroxide and crystalline silica. Also, Cerdec 29-1777 Amber stain is also known to contain silver sulfide, copper oxide, copper-iron sulfide and kaolin clay. Also, Cerdec 29-346 Amber stain is known to contain copper, copper oxide, silver sulfide, barium sulfate, iron sulfate, iron oxide, and crystalline silica. Also, Cerdec 24-2702 black stain is known to contain lead borosilicate frit, C.I. pigment black 27 (containing cobalt compounds, iron oxide chromium compound), C.I. pigment black 30 (containing nickel, manganese and chromium compounds and iron oxide) and C.I. pigment blue 72 (containing cobalt compound).

Comparable mixed metal oxide and glass frit materials can be secured through manufacturers such as Bayer Company, Cookson Matthey Zircon, Ferro Corp., Cerdec Corp., E.I. duPont de Nemours & Co., Hoechst Celanese Corp., and Dow Chemical Co.

The method of this invention is especially suitable for marking metals, plastics, glasses, and glass ceramics. Glasses and glass ceramics are well known to the person skilled in the art and described, for example, in Ullmanns Enzyklopädie der technischen Chemie, 4th edition, Vol. 12, pp. 317–366.

By ceramic materials are meant inorganic, non-metallic, high-melting materials that are usually referred to in the literature as clay ceramics and special ceramics. Examples thereof are oxides in crystalline or glassy form, e.g. alkali metal or alkaline earth metal aluminosilicates or aluminoborates, as well as non-oxides such as carbides, nitrides, and silicides. For further examples, attention is drawn to Ullmanns Enzyklopädie der techn. Chemie, 4th Edition, Vol. 13, pp. 712–716.

Glazes are classified chemically as follows:

1. Bases, the conspicuously fluxing agents, represented by alkali metal oxides, the alkaline earth metal oxides, zinc oxide, lead oxide and many coloring oxides or chromophones.

2. Intermediates, which includes amphoteric oxides, a group from which alumina is the common example and to which ferric, chromic, manganic, and other oxides are sometimes assigned. Boric acid is sometimes considered a member of this group.

3. Acids, of which silico, phosophoric oxide, zirconia and flourine belong.

Glazes are glassy coatings applied to a ceramic material and having a composition very similar to that of glass (op. Cit., pp. 722–724). Typical examples of glazes are those consisting of quartz, clay, alkali metal oxides, alkaline earth metal oxides, and low-melting oxides (such as $Na_2O$, $K_2O$, $CaO$, $BaO$, and $PbO$) as fluxes.

Depending on the utility, the materials to be marked may be colorless, white, black or colored with a suitable pigment on which the resulting marking layer additionally provides contrast or which contains a pigment (e.g. metal, glass, ceramic or organic colorant).

In the practice of this invention, the laser or diode utilized must provide a relatively low energy level ranging from 1 to 20 watts at the workpiece surface to be marked. Commercially available and conventionally powered laser marking systems operating in either continuous wave or pulsed mode can be used. For example, a pulsed, Nd:YAG laser with a maximum capacity of 100 watts and pulse durations of 5 to 200 microseconds at a frequency of 20 kHz or higher could be used. However, use of this type of laser would require reducing the effect of the radiant energy using mechanical apertures and/or neutral density filters and/or polarizers and/or de-focusing the beam at the surface of the workpiece as shown in FIG. 10.

Figure 7:
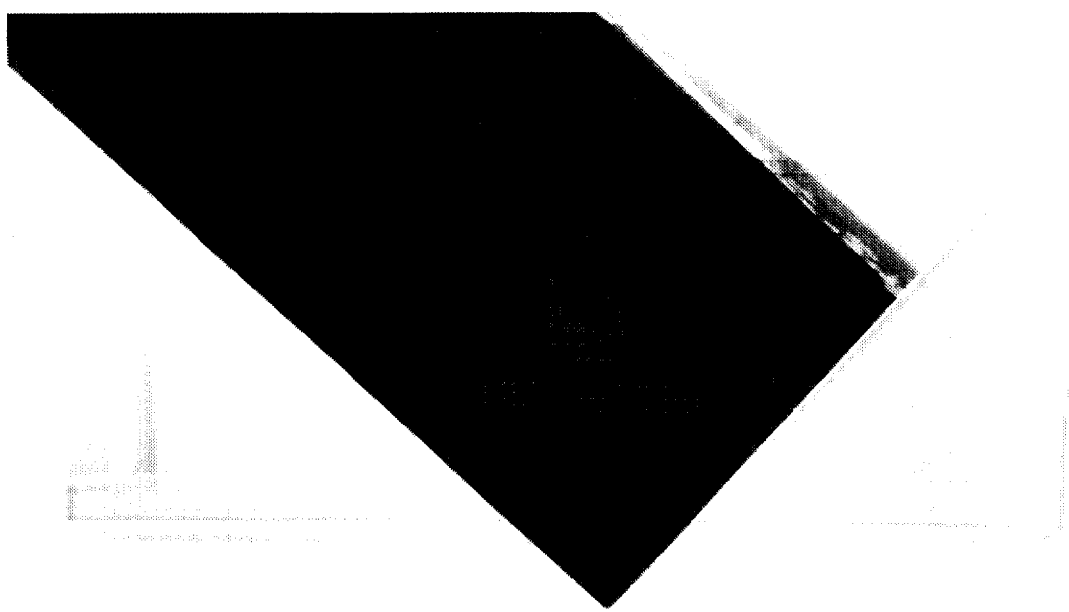
Figure 8:
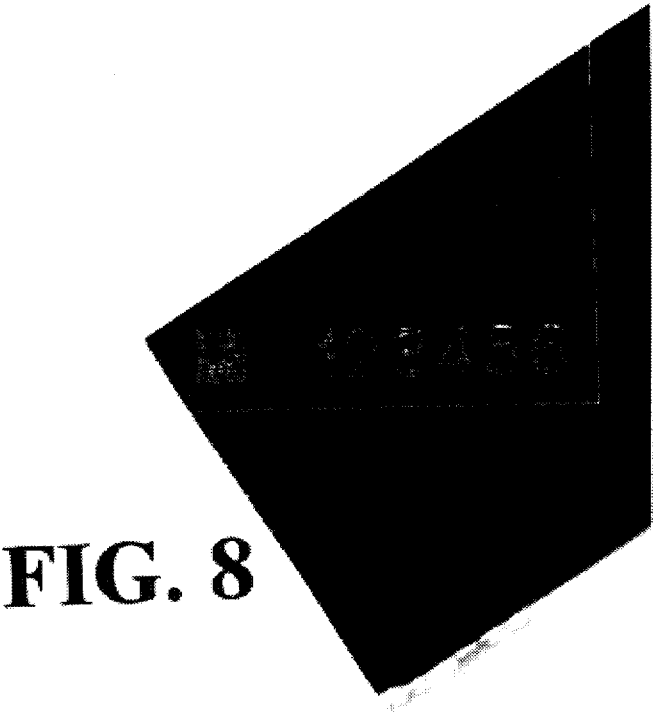

The workpiece illustrated in FIG. 7 was created using a Lumonics Lightwriter™ lamp pumped Nd:YAG laser marker configured with a 2 mm mechanical aperture and a polarizer which produced a CW beam focused by a 100 mm by 100 mm flat field lens to a spot size of approximately 125 microns with measured power of 5 watts and which was moved by a beam steering mechanism at a speed of 200 mm/second.

Additionally, a Uniphase Stablite™ diode pumped Nd:YAG laser has been used which produced a 700 micron diameter CW beam focused using a 50 mm lens to a spot size of 90 microns with measured power of 3.1 watts and moved manually at a speed of approximately 50 mm/second.

Figure 10:
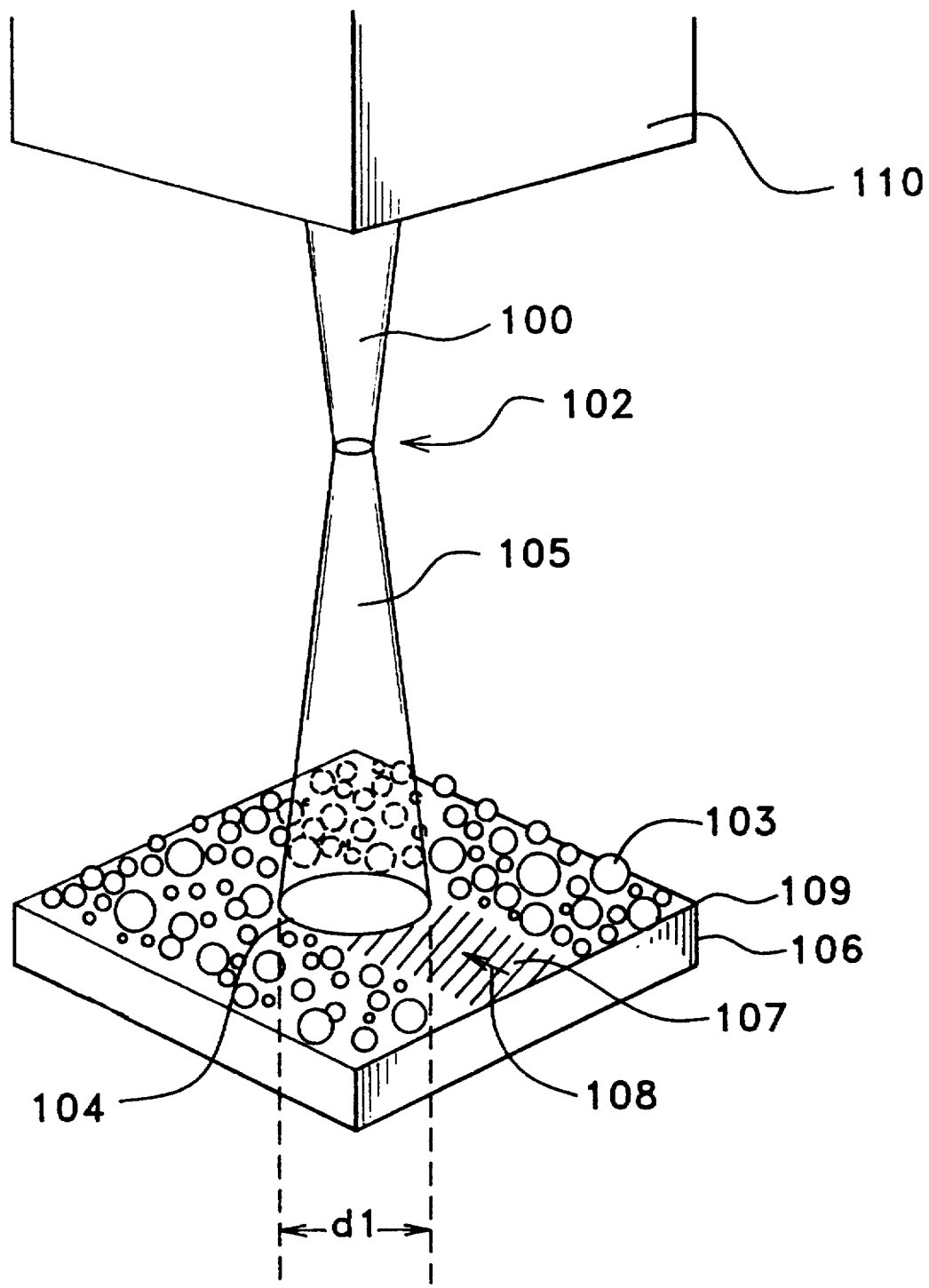
FIG. 10 is a drawing of the inventive process in action.
Figure 11A:
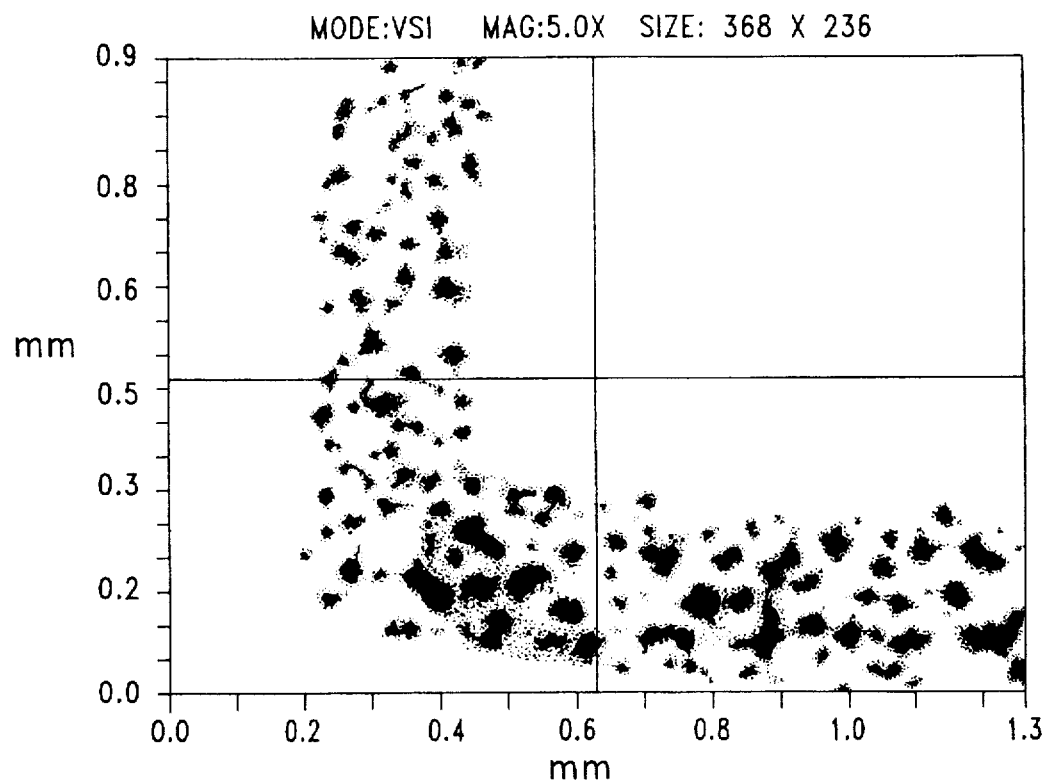
FIG. 11 is a 2D profile of a small portion of the mark produced with the inventive process as shown in FIG. 7 with an average thickness of approximately 3 microns and a maximum thickness of approximately 14 microns. Similar results are obtained when using the inventive process on other substrate materials.
Figure 11B:
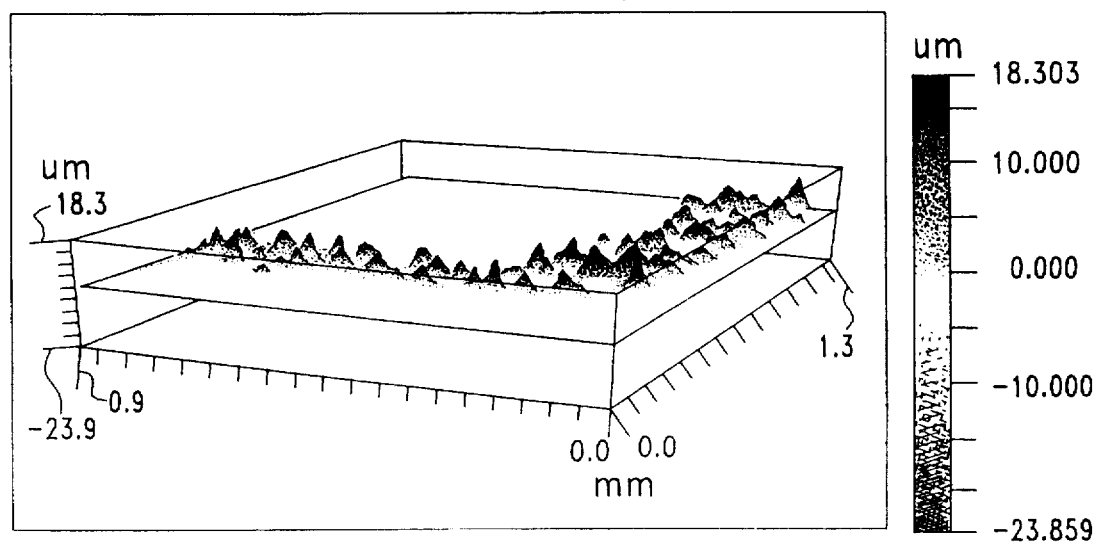
Figure 11C:
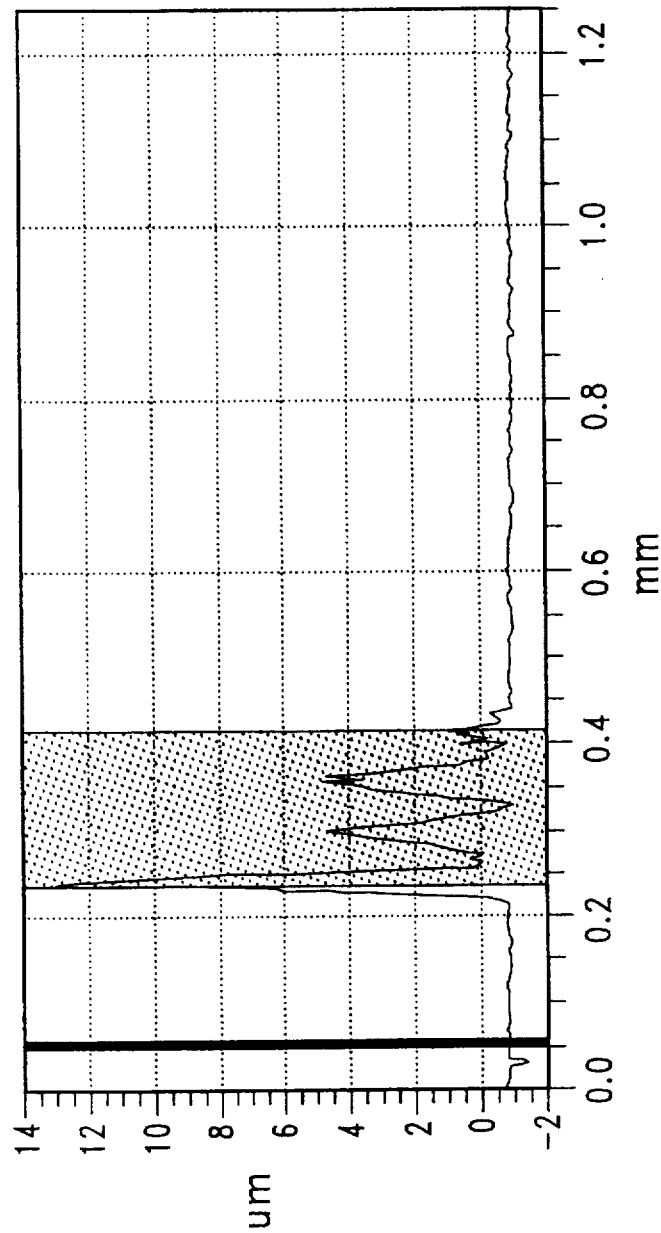
Figure 11D:
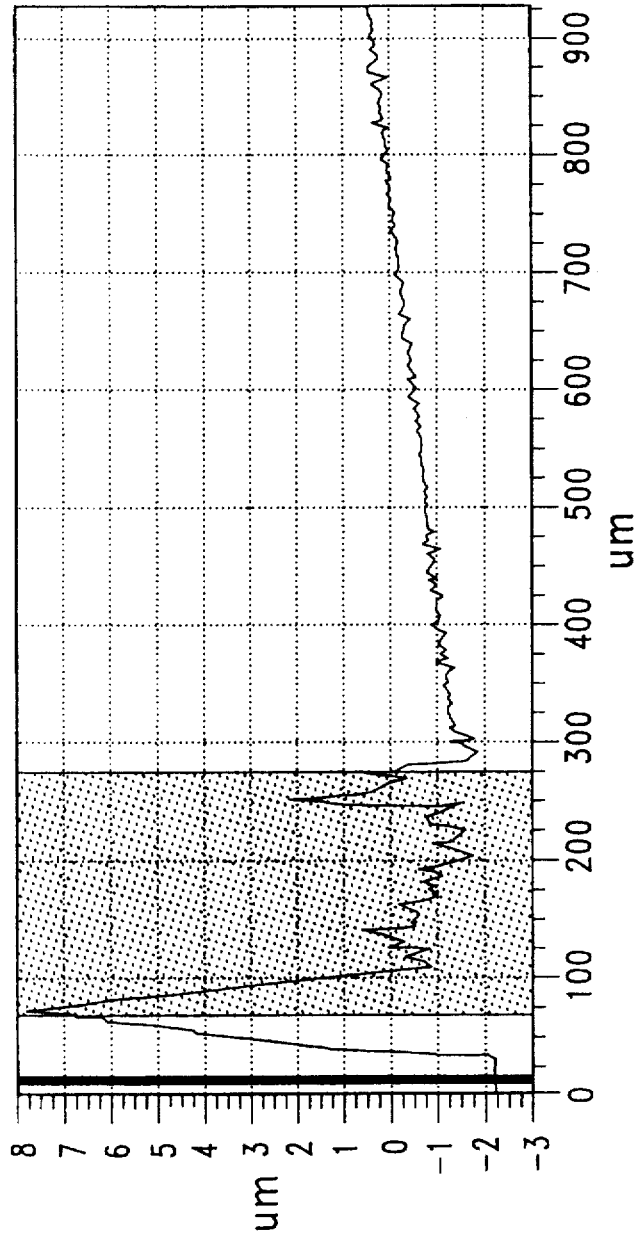

In FIG. 10, the conventionally powered laser beam 100, 105 is de-focused at the surface 109 of the workpiece 106 by allowing the laser beam 100 to pass through the focal plane 102 and impinge upon the marking material 103 applied to the surface 109 of the workpiece 106. It has been shown that placing the workpiece as shown below the focal plane using the diverging radiant energy 105 is preferred over the use of the converging radiant energy 100 above the focal plane 102. The resulting spot 104 has a diameter d1 in the preferred mode of 5 to 200 microns. The direction of movement 108 of the diverging laser beam 105 on the surface of the marking material 103 is shown. A beam steering mechanism 110 moves the beam. The resulting bonded layer comprising the mark 107 is shown in contrast to the remaining non-irradiated marking material 103 on the surface 109 of the workpiece 106.

In the preferred embodiment of this invention, a less expensive, less powerful air-cooled laser which consumes considerably less electric energy, such as a direct diode or diode pumped laser, is used. Optimal results are generally obtained using 5 watts of average power with a spot size of 125 microns moving at a speed of 200 mm/sec across the surface of the marking material.

Lasers whose parameters can be readily adjusted, for example, pulse content and pulse duration, permit the best possible adaptation to the requirements of the marking material 103 and the composition of workpiece 106 to be marked. In no case is a preheating of the workpiece 106 necessary. The proper radiant energy is that at which the marking material absorbs energy most efficiently. It is a major advantage of the present invention that only a single pass of the irradiating beam is required to practice the invention. In all experiments the inventive process was practiced at a room temperature of approximately 70° F. Furthermore, it is believed that both hot and cold substrate materials can be marked during their production using the inventive process.

In an alternate embodiment of the invention, the workpiece may be moved under a stationary laser beam at similar relative speeds to produce the desired mark.

Preferably, the relative speeds taught herein are executed by the use of a computer controlled workpiece movement mechanism (not shown) for example, an X-Y and/or rotary stage using stepper and/or servo motors as supplied by Newport Corporation and/or a beam steering mechanism (not shown) for example the HPM™ Scan Head using galvo-mirrors as supplied by General Scanning, Inc. Alternately, beam steering can be effected, for example, acousto-optically, holographically, or by polygon scanners.

The preferred combinations of marking materials and workpiece composition are listed below:

TABLE I

| Marking Materials | Substrate Materials |
|---|---|
| 1. Glass frit with energy absorbing enhancers and certain colorants and/or pigments including porcelain enamels | Glass, ceramic, porcelain and certain metals including aluminum, brass, steel and stainless steel |
| 2. Mixed metal oxides with energy absorbing enhancers and certain colorants and/or pigments | Metals including aluminum, brass, copper, nickel, tin, steel, stainless steel, and certain glasses, ceramics and plastics |
| 3. Mixed organic pigments with energy absorbing enhancers | Plastics including ABS, PVC, Nylon ™, Delrin ™, Teflon ™ and Plexiglas ™ |

Use of and/or the combination of different compositions of marking material, second and/or subsequent applications of marking material and/or the adjustment of laser parameters will result in variations in the durability, appearance, and structural form of the resulting mark. Thus, a person skilled in the art of laser marking can create a wide variety of marking characteristics to suit his requirements. All of these marking characteristics can be achieved with the use of a single low-power, low-cost air-cooled diode laser. Furthermore, an infinite variety of colors can be achieved. These features are a significant advance in the art of surface marking.

Preparation of the marking material, in liquid form, can, for example, occur through low shear mechanical mixing, high shear mechanical mixing, ultrasonic mixing and/or milling. The marking material, in liquid form, can be manually or automatically applied to the substrate surface at the desired thickness by: a) hand-painting it onto the surface; b) mechanically brushing or rolling it onto the surface; c) spraying it onto the surface; d) pad or screen printing it onto the surface; or e) flood coating the substrate surface and then scraping across the surface of the marking material on guides of desired thickness or spinning the substrate to achieve the desired thickness. Excess material not bonded to the substrate surface can be removed by conventional cleaning processes. In high-volume applications, the unused marking material can be recovered from the cleaning process and reused.

The marking material in solid form can be manually or automatically brought into contact with the substrate surface at the desired thickness by: a) pressure sensitive, slightly self-adhesive labels; or b) non-adhesive tape pressed against the substrate surface by a mechanical apparatus. The label and tape fabrication insure the proper and uniform thickness and composition of the marking material then brought into contact with the substrate surface. Additional materials used in the application of the marking material in liquid form or in the fabrication of tape and/or labels are substantially vaporized into smoke and vented away from the substrate. A laminar air flow across the surface of the workpiece is created by such venting and/or exhausting equipment insuring a consistent localized environment in which the inventive process can occur.

Transfer Marking Medium

In a particular aspect, the invention provides transfer marking media for use in the laser marking process.

These media include a carrier to which is applied, or into which is incorporated, the necessary marking material. Of particular note are pressure sensitive, slightly self-adhesive or non-adhesive tape or labels to be brought into contact with the substrate surface by a mechanical apparatus. Suitable carriers are, for example, paper and flexible plastic films such as polyester, polyethylene, and polypropylene films.

The marking materials can be formulated into a coating composition which is coated onto the carrier surface. The composition can, for example, be in the form of a pressure sensitive adhesive formulation. Alternatively, the marking material can be, for example, incorporated into the flexible polymer film of the carrier such as polyester, polyethylene, or polypropylene.

The marking material can also take the form of the so-called glass enamels. These enamels generally incorporate a lead-containing or preferably a lead-free glass frit, a colorant, and/or colored glass frit and an organic carrier.

These enamels are conventionally applied onto glass or ceramic or other non-porous substrates and fired at temperatures in the neighborhood of 600° to 900° C. to fuse the enamel to the surface of the workpiece (the substrate). In the present invention, the enamel can be coated in the desired thickness on the desired carrier to form the transfer marking medium.

The transfer marking medium containing the marking material either coated thereon or incorporated therein is then brought into contact with the surface of the substrate to be marked and contacted with the laser or diode based energy to effect the necessary marking. Following the application of the laser or diode based energy, the excess marking medium is removed from the substrate when the carrier is separated from the substrate surface.

The marking materials may be defined as those materials which, upon application of sufficient laser or diode based energy to produce the necessary heat, bond to glass or ceramic or other non-porous substrate to provide an enhanced contrast and/or color marking on the substrate. Low temperature glass frits can be used alone or in combination with other materials.

Examples of suitable inorganic pigments which might be used are described in Ullmanns Enzyklopädoe der techn. Chemie, 4th Edition, Vol. 14, pp. 1–12, and in the publication of the Dry Color Manufacturers' Association (DCMA) "Classification and Description of the Mixed Metal Oxide Inorganic Colored Pigments", Second Edition, January, 1982. These pigments are "ceramic colorants:", for example, compounds of oxides of different transition elements or compounds of oxides of transition elements and of metal oxides of elements of the main groups of the Periodic System, e.g., having the spinel-type structure, and also compounds such as zirconium silicate, zirconium oxide or tin oxide, the crystal lattice of which contains ions of transition metals or rare earth metals, as e.g., in zirconium vanadium blue, in zirconium preseodyme yellow and in zirconium iron pink, or the cadmium sulfides and cadmium sulfoselenides as well as inclusion pigments containing such compounds, e.g., based on zirconium silicate, tin oxide, zirconium oxide or quartz.

Examples of typical ceramic colorants are cobalt aluminates, chrome tin pink sphere, chrome tin orchid cassitorite, tin vanadium yellow, zirconium preseodyme yellow, zirconium iron pink, the cadmium sulfoselenides and cadmium sulfides and the inclusion compounds containing them, e.g., zirconium silicate, tin oxide, zirconium oxide or quartz; copper-red, manganese pink, colcothar, the iron oxide brown pigments such as iron oxides, iron-chrome-alumina spinels, manganese-alumina spinels, wine-chrome spinels, iron-alumina spinels, zinc-iron spinels, nickel-iron spinels, manganese-chrome spinels, zinc-iron-chrome spinels, tin oxide, titanium dioxide and titanates, e.g., nickel-antimony titanate, chrome-antimony titanate or manganese-antimony titanate.

Preferred pigments are zirconium vanadium yellow, preseodyme yellow, the iron oxide brown pigments such as zinc-iron-chrome spinels and zirconium iron pink, titanium dioxide, titanates, cadmium sulfides and cadmium sulfoselenides as well as inclusion pigments containing such compounds.

Examples of laser or diode based energy sources to be used are solid state pulsed and/or CW lasers such as ruby lasers or frequency multiplied Nd:YAG lasers, pulsed lasers with booster such as pulsed dye lasers or Raman shifter, and also continuous-wave lasers with pulse modifications (Q-switch, mode locker), for example, on the basis of CW Nd:YAG lasers with or without frequency multiplier or CW ion lasers (Ar, KR), as well as pulsed metal vapor lasers; for example, copper vapor lasers or gold vapor lasers, or high-capacity pulsed or continuous wave semi-conductor diode lasers, and also pulsed gas lasers such as CO2 and excimer.

What is preferred is a low-power (six watts), low-cost continuous-wave diode laser. Any of the other higher power lasers need to have the power partially attenuated by known means including mechanical apertures and/or neutral-density filters and/or polarizers and/or low-efficiency mirrors.

The wavelength to be selected for the laser or diode based energy source is that at which the marking material, with or without the energy absorbing enhancer absorbs the radiation most efficiently.

Several different methods are suitable for laser marking, for example: a) the mask method whereby the area to be marked is uniformly coated with the marking material and the radiant energy passes through a fixed, data specific mask and impinges onto the marking material to produce the desired mark; and b) the dot-matrix method whereby the area to be marked is uniformly coated with the marking material and the radiant energy passes through a computer controlled, changeable data, dot-matrix mask and impinges onto the marking material to produce the desired mark; and c) the beam deflection method whereby the area to be marked is uniformly coated with the marking material and the radiant energy passes through a beam steering head and impinges onto the marking material to produce the desired mark; and d) the X-Y plotter method whereby the area to be marked is uniformly coated with the marking material and the radiant energy moves on a gantry type X-Y mechanism utilizing mirrors and/or fiber-optics and impinges onto the marking material to produce the desired mark; and e) the part moving method whereby the area to be marked is uniformly coated with the marking material and the workpiece to be marked is moved using an X-Y motor driven stage under a stationary beam which impinges onto the marking material to produce the desired mark; and f) the area irradiation method whereby data specific marking material is uniformly applied to the surface of the workpiece and the data specific marking area is irradiated by means of a beam steering mechanism or by means of moving the workpiece under a stationary beam. In methods b), c), d), e) and f) the laser is preferably combined with a laser marking system so that the marking material can be irradiated with any, e.g., computer programmed, digits, letters and special symbols where the laser beam strikes the marking material in the most efficent manner possible.

In one particularly important aspect of the invention, the marking materials can be formulated to absorb a narrow band of wavelengths, e.g., approximately 1 micron, and will react with the substrate material when the proper temperature is achieved. In this way, a single optimal power source (laser or diode) can be employed to mark all materials.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A thermally activated, chemically based marking method comprising the steps of:

applying a layer of glass frit material containing an energy absorbing enhancer to a glass substrate;

irradiating said layer with a radiant energy beam having a wavelength selected to excite the energy absorbing enhancer in accordance with the form of a marking to be applied, thereby forming a bonded and permanent marking layer atop the substrate which is visible in contrast with the substrate; and wherein the layer of glass frit material further comprises a thickness ranging between 5 and 500 microns.

2. The method of claim 1 further comprising the step of providing a laminar air flow across the substrate during the irradiating step.

3. The method of claim 1, wherein the glass frit material further comprises borosilicate glass and the energy absorbing enhancer further comprises a colorant.

4. The method of claim 1, wherein the radiant energy beam further comprises a laser beam having an energy level ranging between 1 and 30 watts a spot size ranging between 5 and 200 microns, and a marking speed along the substrate ranging between 25 and 1000 mm/sec.

5. The method of claim 4, wherein the energy level ranges from 1–12 watts cw.

6. The method of claim 1 further comprising the step of starting at a room temperature of about 70° F.

7. The method of claim 1, wherein the glass frit material further comprises a colorant.

8. A glass material as laser marked by the process according to claim 1.

9. A thermally activated chemically based marking method comprising the steps of:
applying a layer of glass frit material containing an energy absorbing enhancer to a metal substrate;
irradiating said layer with a radiant energy beam having a wavelength selected to excite the energy absorbing layer in accordance with the form of a marking to be applied, thereby forming a bonded and permanent marking layer atop the substrate which is visible in contrast with the substrate; and
wherein the layer of glass frit material further comprises a thickness ranging between 5 and 500 microns.

10. The method of claim 9 further comprising the step of providing a laminar air flow across the substrate during the irradiating step.

11. The method of claim 9, wherein the glass frit material further comprises borosilicate glass, and the energy absorbing enhancer further comprises a colorant.

12. The method of claim 9, wherein the radiant energy beam further comprises a laser beam having an energy level ranging between 1 and 30 watts, a spot size ranging between 5 and 200 microns, and a marking speed along the substrate ranging between 25 and 1000 mm/sec.

13. A metal material as laser marked by the process according to claim 9.

14. The method of claim 9 further comprising the step of starting at a room temperature of about 70° F.

15. The method of claim 9, wherein the glass frit material further comprises a colorant.

16. A thermally activated chemically based marking method comprising the steps of:
applying a glass frit material containing an energy absorbing enhancer to a carrier;
placing the carrier in contact with the substrate to be marked; and
irradiating the carrier with a radiant energy beam having a wavelength selected to excite the energy absorbing enhancer in accordance with the form of a marking to be applied, thereby forming a bonded and permanent marking layer atop the substrate which is visible in contrast with the substrate.

17. A thermally activated chemically based marking method comprising the steps of:
applying a layer of glass frit material containing an energy absorbing enhancer to a substrate to be marked in the form of a marking to be applied;
irradiating said layer with a radiant energy beam having a wavelength selected to excite the energy absorbing enhancer, thereby forming a bonded and permanent marking layer atop the substrate which is visible in contrast with the substrate; and
wherein the layer of glass frit material has a thickness ranging between 5 and 500 microns.

18. The method of claim 17 further comprising the step of providing a laminar air flow across the substrate during the irradiating step.

19. The method of claim 17, wherein the glass frit material further comprises borosilicate glass and the energy absorbing enhancer further comprises a colorant.

20. The method of claim 17, wherein the radiant energy beam further comprises a laser beam having an energy level ranging between 1 and 30 watts and a marking speed along the substrate ranging between 25 and 1000 mm/sec.

21. The method of claim 17 further comprising the step of starting at a room temperature of about 70° F.

22. The method of claim 17, wherein the glass frit material further comprises a colorant.

23. A glass material as laser marked by the process according to claim 17.

24. A thermally activated chemically based marking method comprising steps of:
applying a layer of glass frit material comprising an energy absorbing enhancing component to a metal substrate; and
irradiating said layer with a radiant energy beam having a wavelength selected to excite the energy absorbing enhancing component, thereby forming an adhered layer atop the substrate which is visible in contrast with the substrate.

25. The method of claim 24, wherein the energy level ranges from 1–12 watts cw.

26. A thermally activated chemically based marking method comprising steps of:
applying a glass frit material comprising an energy absorbing enhancing component to a carrier;
placing the carrier in contact with the substrate to be marked; and
irradiating the carrier with a radiant energy beam having a wavelength selected to excite the energy absorbing enhancing component in accordance with the form of a marking to be applied, thereby forming a bonded and permanent marking layer atop the substrate which is visible in contrast with the substrate.

27. The method of claim 26, wherein the energy level ranges from 1–12 watts cw.

28. A thermally-activated chemically-based marking method comprising the steps of:
applying a layer of glass frit material comprising an energy-absorbing enhancing component to a substrate selected form the group consisting of glass, ceramic, porcelain, and metal;
irradiating said layer with a radiant energy beam watts and having a wavelength selected to excite the energy absorbing enhancing component in accordance with the form of a marking to be applied, thereby a marking layer bonded to a substrate surface and contrasting with said substrate surface and not damaging said substrate surface; and
wherein the radiant energy source is a continuous-wave diode laser having an energy level of about six watts.

29. The method of claim 28, wherein said glass frit material is in liquid form.

30. The method of claim 28, wherein said radiant energy beam is a laser beam having a spot size ranging between 5 and 200 microns and a marking speed along the substrate ranging between 25 and 1000 mm/sec.

31. A thermally-activated chemically-based marking method comprising the steps of:

applying a layer of glass frit material containing an energy absorbing enhancer to a glass substrate;

irradiating said layer with a radiant energy beam having a wavelength selected to excite the energy absorbing enhancer in accordance with the form of a marking to be applied, thereby forming a bonded and permanent marking layer atop the substrate which is visible in contrast with the substrate;

wherein the radiant energy beam further comprises a laser beam having a spot size ranging between 5 and 200 microns, and a marking speed along the substrate ranging between 25 and 1000 mm/sec, and an energy level that is about 5 watts Q switched at about 20,000 Hz.

32. A thermally-activated chemically-based marking method comprising the steps of:

applying a layer of glass frit material comprising an energy-absorbing enhancing component to a substrate selected form the group consisting of glass, ceramic, porcelain, and metal;

irradiating said layer with a radiant energy beam having an energy level equal to or less than six watts and having a wavelength selected to excite the energy absorbing enhancing component in accordance with the form of a marking to be applied, thereby forming a marking layer bonded to a substrate surface and contrasting with said substrate surface and not damaging said substrate surface; and wherein the radiant energy source is a continuous-wave diode laser.

33. The method of claim 32, wherein said glass frit material is in liquid form.

34. The method of claim 32, wherein said radiant energy beam is a laser beam having a spot size ranging between 5 and 200 microns and a marking speed along the substrate ranging between 25 and 1000 mm/sec.

\* \* \* \* \*